United States Patent
Kroll et al.

(10) Patent No.: US 7,665,590 B2
(45) Date of Patent: Feb. 23, 2010

(54) COUPLING SYSTEM

(75) Inventors: Jürgen Kroll, Bühl (DE); Hartmut Mende, Bühl (DE); Bin Zhou, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 12/006,051

(22) Filed: Dec. 28, 2007

(65) Prior Publication Data

US 2008/0179163 A1 Jul. 31, 2008

Related U.S. Application Data

(63) Continuation of application No. PCT/DE2006/000995, filed on Jun. 10, 2006.

(30) Foreign Application Priority Data

Jun. 28, 2005 (DE) .................. 10 2005 030 504

(51) Int. Cl.
*F16D 3/18* (2006.01)
(52) U.S. Cl. ................ 192/48.8; 192/55.61; 192/70.17; 192/213.2
(58) Field of Classification Search .............. 192/55.61, 192/213.2; 464/68.1
See application file for complete search history.

(56) References Cited

U.S. PATENT DOCUMENTS

| 1,467,732 | A | * | 9/1923 | Litle, Jr. ................... 192/70.2 |
| 2,443,688 | A | * | 6/1948 | Mcfarland ................... 403/29 |
| 3,060,705 | A | | 10/1962 | Stenger ..................... 464/68.4 |
| 3,222,772 | A | * | 12/1965 | Leyner ......................... 29/447 |
| 4,440,281 | A | * | 4/1984 | Hauguth .................... 192/48.8 |
| 2004/0055842 | A1 | * | 3/2004 | Bauer et al. ................. 192/70.2 |
| 2004/0216296 | A1 | * | 11/2004 | Ahnert ......................... 29/428 |
| 2006/0289263 | A1 | | 12/2006 | Friedmann et al. ......... 192/48.8 |
| 2008/0179157 | A1 | * | 7/2008 | Zhou et al. ................. 192/48.1 |

FOREIGN PATENT DOCUMENTS

| DE | G 88 15 843.8 U1 | 4/1989 |
| DE | 10 2005 027 608 A1 | 12/2005 |
| DE | 10 2005 037514 A1 | 3/2006 |
| EP | 0 223 442 A1 | 5/1987 |
| FR | 2.118.762 | 7/1972 |
| JP | 59159431 A1 | 9/1984 |
| WO | WO 2005/031188 A1 | 4/2005 |

\* cited by examiner

*Primary Examiner*—Rodney H Bonck
(74) *Attorney, Agent, or Firm*—Alfred J. Mangels

(57) ABSTRACT

A coupling system including at least two sub-units, one of which is pre-assembled on the engine side of a motor vehicle drive train, namely on the output shaft of the engine, and the other sub-unit is pre-assembled on the transmission side of the drive train. The pre-assembled sub-units each include respective interengaging teeth to provide a positive drive connection, and the teeth are biased toward each other to reduce circumferential play and thereby reduce noise that would be generated during operation of the drive train.

8 Claims, 1 Drawing Sheet

COUPLING SYSTEM

CROSS-REFERENCE TO RELATED APPLICATION

This is a continuation of International Application Serial No. PCT/DE2006/000995, with an international filing date of 10 Jun. 2006, and designating the United States, the entire contents of which is hereby incorporated by reference to the same extent as if fully rewritten.

BACKGROUND OF THE INVENTION

1. Field of the Invention

The present invention relates to a clutch unit or clutch system including at least two sub-units, one sub-unit being pre-assembled on the engine side, namely on the output shaft of an engine, and the other sub-unit being pre-assembled on the transmission side. Preferably, the sub-unit that is pre-assembled on the engine side includes a torsional vibration damping device, and the sub-unit that is pre-assembled on the transmission side has at least one friction clutch.

2. Description of the Related Art

With regard to the general construction and manner of function of the clutch unit described in the present application, as well as the pre-assembly and fitting of the sub-units that form the latter, which may be pre-assembled on the one hand on the engine side and on the other hand on the transmission side, reference is made to German Patent Publication No. DE 10 2005 027 608 and in particular to German Patent Application No. DE 10 2004 042 640.6. The last-named application discloses a plug-in connection between a damping system that is pre-assembled on the engine side and a clutch device that is pre-assembled on the transmission side, the clutch being designed as a dual-disk clutch or double clutch.

An object of the present invention is to ensure a correct drive connection between the two sub-units during assembly of the engine and transmission. In particular, noises that develop within the drive connection existing between the sub-units, such as for example rattling noises, are to be prevented. Furthermore, the drive connection is to be realizable in an especially simple and inexpensive way.

SUMMARY OF THE INVENTION

According to the present invention, the object is achieved with a clutch unit of the type described at the beginning, in part by having the two sub-units connectable with each other via a drive connection that includes at least one axial plug-in connection which has intermeshing profiles and counter-profiles, by which the rotary coupling between the two sub-units can be produced, where at least individual ones of the profiles that form profiles and counter-profiles are biased toward each other.

Such biasing can occur in the radial direction, whereby any existing rotational play can be eliminated. In an advantageous manner, the biasing between the profiles and counter-profiles can however also take place in the circumferential direction. To this end, at least individual ones of the profiles that form the profiles and/or counter-profiles can consist of two components with teeth, the teeth being supported in the circumferential direction against opposing teeth (counter-profiles and/or profiles). That makes it possible to ensure practically play-free meshing between the corresponding profiles. Due to the biasing present between the two components, it is also possible to realize a certain rotationally elastic connection between the profiles and counter-profiles. The torsional stiffness of that elastic biasing is dependent on the force that is produced by at least one energy storage device that biases the two components, for example a helical compression spring. The torsional stiffness produced between the profiles and counter-profiles can advantageously be in the magnitude of between 10 and 60 Nm/°.

To simplify assembling the profiles and counter-profiles, it can be useful if at least individual profiles that form the profiles and/or counter-profiles are formed of partial profiles that are biased in opposite directions with respect to each other in the circumferential direction, such as in particular partial teeth, which are held in an angular position counter to the biasing force acting on them by means of at least one holding element, which makes it possible to join the profiles and counter-profiles together that form the axial plug-in connection. While the profiles and counter-profiles are being joined together, or afterward, the holding element can be brought into a position that causes at least partial circumferential biasing of the plug-in connection. The partial profiles form profiles or counter-profiles of changeable width, which are under bias and without play in the gap into which they mesh.

BRIEF DESCRIPTION OF THE DRAWINGS

The invention will be explained in greater detail on the basis of FIGS. 1 through 4a, in which.

DESCRIPTION OF THE PREFERRED EMBODIMENTS

Figure 1:
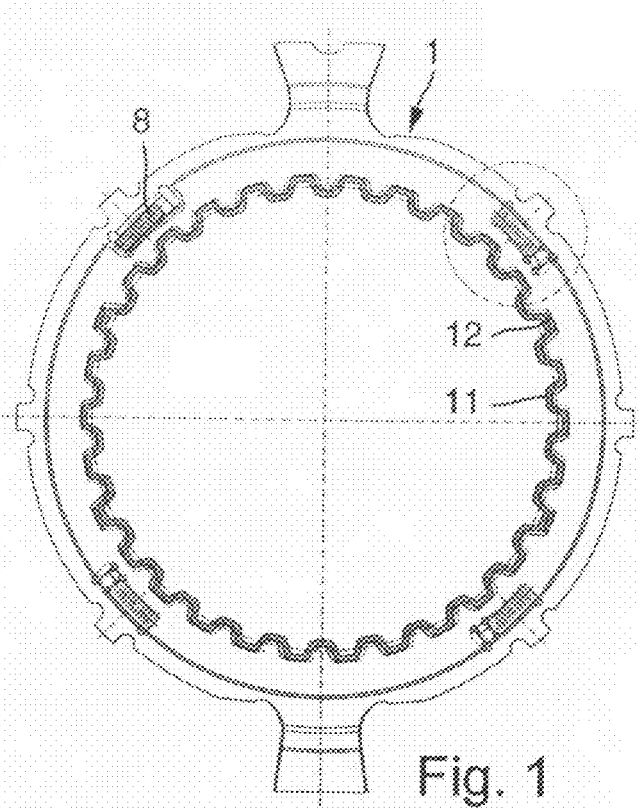
FIG. 1 is an end view showing the interconnection in accordance with the present invention.
Figure 2:
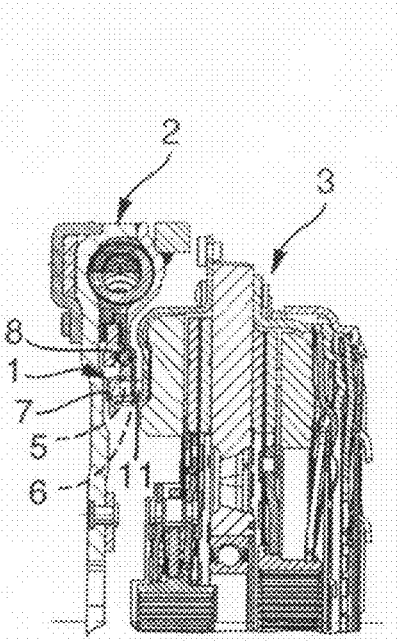
FIG. 2 is a longitudinal quarter-section through the structure shown in FIG. 1.

Referring to FIGS. 1 and 2, to prevent noises in the toothed connection 1 between damper 2 (ZMS) and double clutch 3, a toothed connection 1 is provided, which preferably remains free of play up to a load of about 40 Nm. In addition, the toothed connection 1 should be easily insertable during assembly.

Figure 3:
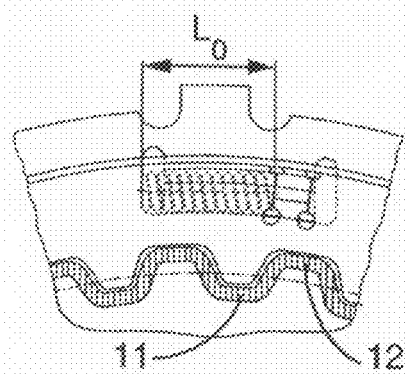
FIG. 3 is an enlarged, fragmentary view of a portion of the structure shown in FIG. 1 within the dashed line.
Figure 3A:
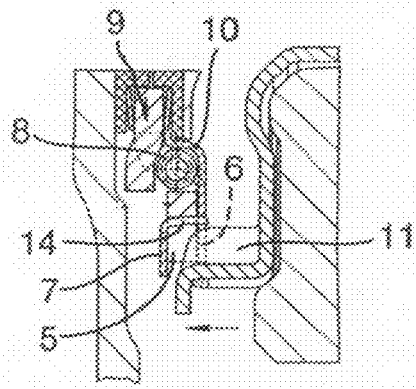
FIG. 3a is an enlarged, longitudinal cross-sectional view of the interconnection shown in FIG. 2 before engagement of the components.
Figure 4:
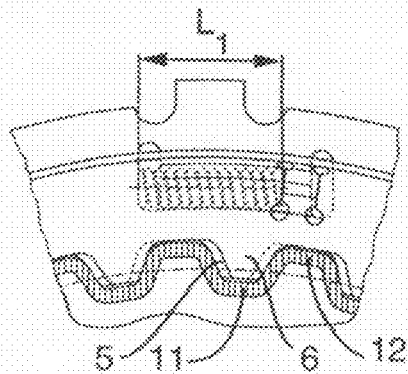
FIG. 4 is an enlarged view similar to that of FIG. 3 showing parts displaced relative to each other.
Figure 4A:
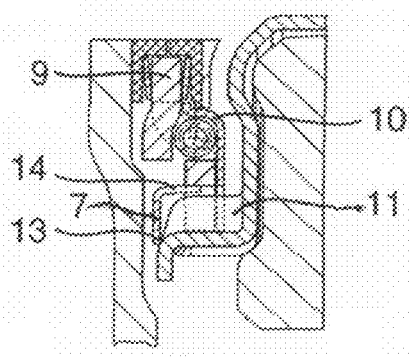
FIG. 4a is an enlarged, longitudinal cross-sectional view similar to that of FIG. 3a and showing the components in the engaged condition.

The principle of the solution is a double tooth arrangement 5, 6 with spring biasing force, which fulfills the assembly requirements by means of a stop ring 7. The pre-stressed compression springs 8 situated on the circumference press apart the two sheet metal parts 9, 10 provided with internal teeth 5, 6 (the flange 9 and the plate 10). During acceleration the flange 9 conducts the engine torque directly to the drive ring 11, which has outer teeth 12 as the complementing part. During deceleration the drive ring 11 presses through the teeth against the plate 10 and transmits the pushing moment on to the flange 9 through the compression springs 8. The spring force should be large enough to prevent separation of the teeth 5 and/or 6 in some operating conditions. The stop ring 7 ensures that the two sets of internal teeth 5, 6 are aligned before the damper 2 and double clutch 3 are fitted together, so that the outside teeth 12 of the drive ring can easily be brought into engagement with the teeth 5, 6 during assembly. The end face 13 of drive ring 11 pushes stop ring 7 out of the stop position during assembly (FIGS. 3 and 3a), and as soon as the stop fingers 14 slide out of the plate 10, the two parts 5, 6 with inner teeth firmly engage the opposing piece formed by the drive ring 11.

The teeth 5 and 6 thus form partial profiles, which before the profiles and counter-profiles are fitted together, the inner teeth 5, 6 on the one hand and the outer teeth 12 on the other hand are held in place in an angular position against the biasing force acting on them by means of a holding element, which is formed by the stop ring 7. That ensures that it will be simple to plug the two sub-units 2 and 3 together when assembling the engine and transmission. The sub-unit formed by the damper 2 is pre-assembled on the engine side, whereas the second sub-unit, formed by the clutch assembly 3, is pre-assembled on the transmission side.

In the exemplary embodiment illustrated and described, when the two sub-units 2 and 3 are fitted together an automatic biasing occurs between the profiles and counter-profiles formed by the inner teeth 5, 6 on the one hand and the outer teeth 12 on the other hand. That automatic biasing occurs as a result of an axial shifting of the holding element formed by stop ring 7. However, the freeing of the biased state between the two parts 9 and 10 can also occur only after the axial plug-in connection has been made between the two sub-units formed by damper 2 and by double clutch 3, for example manually by means of an ancillary tool.

According to a different solution principle, the stop formed by the ring 7 can be eliminated, in which case the two sets of teeth 5 and 6 are then circumferentially offset from each other in such a manner that the axial tooth spaces remaining between the inner teeth 5 and 6 have a smaller width than the circumferential width, at least of individual teeth of the outer tooth arrangement 12. The flanks of the teeth forming tooth arrangements 5, 6, and 12 are matched to each other in such a manner that when the teeth 5, 6, and 12 are axially fitted together the teeth 5, 6 are twisted in the circumferential direction against the effect of the springs 8. That ensures that after the two sub-units 2 and 3 are brought together at least individual teeth of the outer teeth 12 are circumferentially supported between teeth of the tooth arrangement 5 and 6. The axial insertion of the teeth 12 into the tooth gaps of smaller width formed by the teeth 5 and 6 can be ensured in a simple manner by appropriate design of the axial end faces or of the transition between the end face and the teeth of the tooth arrangement 12. For example, appropriate rounding off or merging slopes can be provided, at least in the end face region of the teeth that form tooth arrangement 12.

The profiles formed by the inner teeth 5, 6 and the outer teeth 12 can be assembled with each other through a shrink fit. In that case the outer teeth 12 can be heated and the inner teeth 5, 6 can be cooled in order to enable assembly with engagement of the inner and outer teeth.

Moreover, at least individual profiles that form the profiles and/or counter-profiles can be formed of partial profiles that are supported against each other in opposite directions. The partial profiles can be held in an angular position against the biasing force acting on them by means of at least one holding element, which makes it possible to fit together the profiles and counter-profiles that form the axial plug-in connection. It is possible while fitting the profiles and counter-profiles together, or afterward, to bring the holding element into a position that causes at least partial circumferential biasing of the plug-in connection.

What is claimed is:

1. A clutch unit for a drive train including an engine and a transmission, said clutch unit comprising: at least two sub-units including a first pre-assembled sub-unit positioned on an output shaft of the engine and including a torsional vibration damper, and a second pre-assembled sub-unit on the transmission side of the drive train and including a double clutch, the two sub-units being couplable with each other through an axial plug-in connection which includes intermeshing profiles and counter-profiles with a predetermined circumferential play between the profiles, wherein the profiles and counter-profiles are biased toward each other to minimize free play therebetween and to reduce noise generated during drive train operation, wherein at least individual profiles that form the profiles and counter-profiles are formed of partial profiles that are supported against each other in opposite directions, at least one holding element for holding the profiles in an angular position against a biasing force acting on them, which holding element enables axially fitting together the profiles and counter-profiles that form the axial plug-in connection, so that when the profiles and counter-profiles are axially brought together axial movement of the holding element enables at least partial circumferential biasing of the plug-in connection.

2. A clutch unit in accordance with claim 1, wherein the biasing takes place in a circumferential direction.

3. A clutch unit in accordance with claim 1, wherein the profiles and counter-profiles are formed on two interengaging components to provide interengaging teeth, wherein the teeth are circumferentially biased against opposing teeth.

4. A clutch unit in accordance with claim 1, wherein the biasing of the profiles and counter-profiles is accomplished through circumferentially acting spring means.

5. A clutch unit in accordance with claim 4, wherein the spring means produce a torsional stiffness on the order of between 10 and 60 Nm/°.

6. A clutch unit in accordance with claim 1, wherein the at least one holding element is carried by the first sub-unit.

7. A clutch unit in accordance with claim 1, wherein the at least one holding element is a stop ring that is released for holding the profiles and counter-profiles together as the first sub-unit and the second sub-unit are joined together.

8. A clutch unit in accordance with claim 7, wherein the stop ring includes an axially-acting stop finger that engages the second sub-unit during axial assembly of the first and second sub-units and is axially urged toward the first sub-unit by the second sub-unit as the first and second sub-units are joined together.

* * * * *